May 14, 1940. F. H. WATSON 2,200,785
VALVE STEM
Filed April 4, 1933
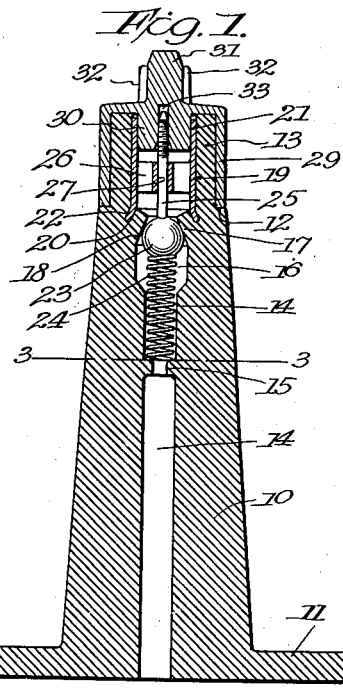
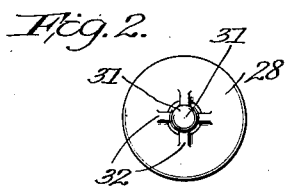
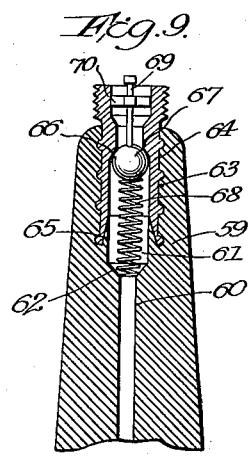
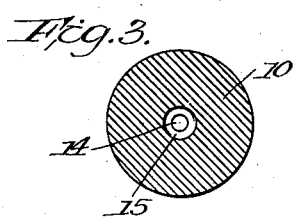
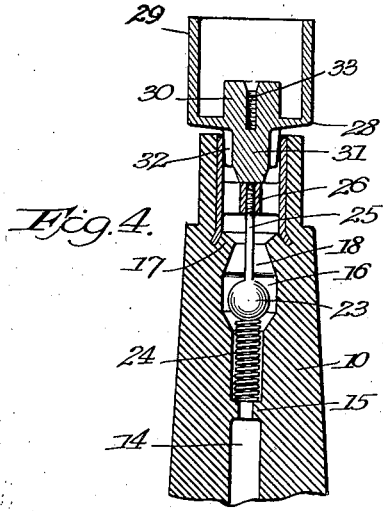
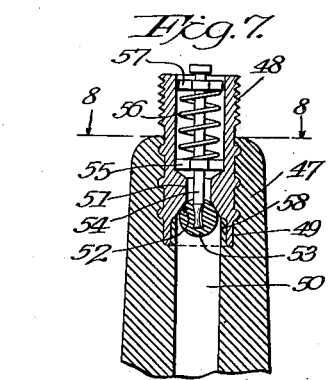
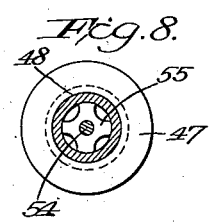
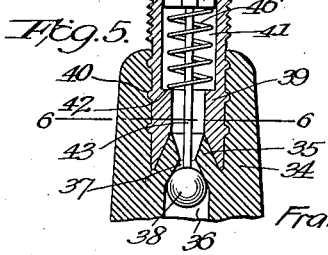
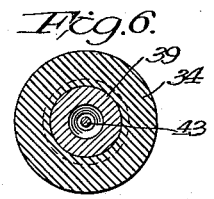
Inventor
Frank H. Watson
By Cushman, Darby & Cushman
Attorneys Patented May 14, 1940

2,200,785

UNITED STATES PATENT OFFICE 2,200,785

VALVE STEM

Frank H. Watson, Jonesboro, Ark., assignor, by mesne assignments, to Jenkins Bros., Bridgeport, Conn., a corporation of New Jersey Application April 4, 1933, Serial No. 664,394

9 Claims. (Cl. 137—69.1)

The present application is in part a continuation of my copending application Serial No. 628,953, filed August 15, 1932, which has matured into Patent No. 2,106,671, granted January 25, 1938.

The invention relates primarily to a valve stem of rubber composition or equivalent material for association with tires, or, customarily, with inner tubes for tires. The general advantages of such stems have been fully discussed in my Reissue Patent No. 18,513, July 5, 1932, and in my copending application Serial No. 601,893, filed March 29, 1932, which has matured into Patent No. 2,018,584, granted October 22, 1935, so that the description herein will be confined to the improvements to be claimed.

In the construction of rubber valve stems a tubular metal insert is, or may be, incorporated in the tip end of the stem. This insert may be primarily for the purpose of receiving valve parts or mainly for the purpose of reinforcement. In either event, I have found that greatly improved results are obtained if the inner edge of the insert is inset in the valve stem material. In the one case air under pressure is prevented from getting behind the insert and loosening the same, and in the other case, while the insert may not be subjected, except upon inflation, to air under pressure, undue distention of the surrounded material, which may be in the form of a shoulder constituting a valve seat, is prevented.

The invention contemplates particularly an arrangement wherein the valve stem presents an integral seat for a check valve and as reinforcement for the seat utilizes the insert as above mentioned, or a skirted closure which confines the stem, or both. The closure, when used, is preferably screw-attachable to the check valve so that, reacting against a stem abutment upon application, it is adapted to pull the check valve tightly against its seat. Further, the closure is preferably so formed that it may be inserted and engaged in the stem passage to hold the check valve unseated.

Without further general discussion I shall proceed to describe the invention with reference to the embodiments shown by way of example in the accompanying drawing. In the drawing:

Figure 1 is a longitudinal axial section of one form of the new valve stem including a closure cap.

Figure 2 is an elevation of the closure cap shown in Figure 1.

Figure 3 is a section on line 3—3 of Figure 1.

Figure 4 is a longitudinal axial section of the stem of Figure 1, showing the cap in tire deflating position.

Figure 5 is a longitudinal axial section of the tip portion of a modified form of valve stem.

Figure 6 is a section on line 6—6 of Figure 5.

Figure 7 is a longitudinal axial section of the tip portion of a further modified form of valve stem.

Figure 8 is a section on line 8—8 of Figure 7, and

Figure 9 is a longitudinal axial section of the tip portion of a still further modified form of valve stem.

Referring first to Figures 1 to 4, reference numeral 10 designates generally the valve stem proper which comprises an elongated body of rubber composition having ordinarily at its base end an extension 11 adapted to be secured to a tube. The body 10 is preferably tapered toward its tip, the taper terminating at a shoulder 12 upwardly of which the portion 13 of the stem is exteriorly substantially cylindrical.

The stem is provided with a through passage 14 constricted as at 15, as here shown by an annular rib. Somewhat above rib 15 the passage is enlarged as at 16, the enlargement being surmounted by a constriction 17 which provides a downwardly faced shoulder 18. Above constriction 17 the passage has a substantially cylindrical terminal enlargement 19, the walls of which terminate in an outwardly flaring groove 20 which surrounds at least the top portion of shoulder 18.

An insert or liner 21 which is of relatively rigid material such as metal, is fitted in enlargement 19 with its lower outwardly flared portion 22 engaged in groove 20 so as to be inset in the stem material around the shoulder. The insert 21 is preferably bonded in place, as by vulcanization.

A check valve member 23 preferably of globular form as shown, is of such size as to be insertable past constriction 17 so as to seat upwardly against shoulder 18 with free movement in the enlargement 16 below the shoulder. A compression spring 24 which is freely insertable through constriction 17 is guided in passage 14 above annular rib 15 and seats with its lower end on the latter. The length of spring 24 is such that it engages the lower end of member 23 to hold the latter normally in the seated position shown in Figure 1. A stem or pin 25 is fixed to member 23 and projects upwardly within liner 21, the upper end of the stem being threaded.

It will be understood that in assembling the valve member 23 and spring 24, the latter is first inserted and then the former to the positions shown in Figure 1. A spider 26 is then inserted in the liner to the position shown in Figures 1 and 4, the spider having an axial bore 27 which slidably receives stem 25. The spider is frictionally held in position in the liner.

While member 23 may be readily forced through constriction 17, particularly if slightly lubricated, it will not be forced back through the constriction by any pressure likely to exist in a tube with which the valve stem is associated. The lower portion of liner 21 which surrounds shoulder 18 is precautionary in this respect since it resists undue distention of the passage.

I preferably provide a cap 28 such as is shown in Figures 1, 2 and 4, this cap comprising a cylindrical skirt 29, a central boss 30 of slightly less diameter than insert 21, and a tip 31 provided with outwardly tapering longitudinally extending ribs 32. Boss 30 is provided with a threaded axial bore 33 preferably somewhat flared at its open end. In applying the cap the same is positioned and turned so as to engage the threaded end of stem 25 in the threaded bore 33. The skirt 29 takes a confining relation to the tip portion 13 of the valve stem and eventually seats on shoulder 12 of the latter. Upon continued turning of the cap its reaction against the shoulder draws valve member 23 tightly against shoulder 18, the lower portion of the skirt 29 confining the valve stem in the vicinity of shoulder 18 with a consequent tendency to hold the latter against expansion. Thus the same tension which holds valve member 23 against its seat holds skirt 29 in position to resist expansion of the shoulder under the seating action of member 23.

If it is desired to unseat valve member 23 so as to deflate the associated tire for any reason, cap 28 is removed, inverted, and its tip 31 inserted in the end of liner 21 to frictionally engage ribs 32 therewith, Figure 4. Insertion of the tip causes it to abut the upper end of stem 25 and unseat valve member 23. When the ribs are sufficiently engaged with the liner the cap will be frictionally held in the position shown in Figure 4 without any further attention from the attendant to permit full deflation of the tire.

Liner 21 serves not only as reinforcing means for the tip end of the stem, and particularly the shoulder 18, but also serves to trip valves in filling devices.

According to Figures 5 and 6, stem 34 may be tapered throughout its length and may have its upper end rounded off or chamfered as shown. The upper end of the stem is provided internally with an integral conically shaped collar 35 which constricts the stem passage 36 and provides a downwardly faced shoulder 37 for the check valve 38 which, as in Figures 1 and 4, is preferably of relatively rigid materials, such as metal. An insert or nipple 39 has a lower end fitted in the recess around collar 35 to reinforce the shoulder in the manner described in connection with Figures 1 to 4. The insert is vulcanized in place and may be provided with ribs as at 40.

Insert 39 has an upper cylindrical enlargement 41 at the lower end of which is an annular shoulder 42. A stem 43 integral with check valve 38 extends upwardly above the tip of the insert and is provided at its free end with a head 44. Below the head and within the insert a spider 45 is fixed to stem 43 and a compression spring 46 is interposed between the spider and shoulder 42. Spring 46 acts to seat the check valve member 38, spider 45 being guided by the inner walls of the insert to maintain stem 43 in substantially co-axial relation thereto. The spring may be originally assembled on stem 43 by passing member 38 therethrough. The insert as shown projects beyond the tip of valve stem 34 and may be threaded to receive the ordinary type of cap, the maximum cross dimension of such cap being preferably less than the diameter of the end of the stem.

According to Figures 7 and 8, a stem 47 similar to stem 34 has inserted in its tip end an insert or nipple 48 generally similar to that shown in Figures 5 and 6, the lower end of the insert being fitted in an annular groove 49 surrounding the stem passage 50 and vulcanized therein. The insert has a constriction 51 which provides a downwardly faced shoulder 52 against which seats a check valve member 53 of yieldable material such as rubber so that it may be forced through the constriction and then expand to seat effectively against shoulder 52. A stem 54 has a flattened end embedded in member 53, the other headed end of the stem projecting slightly above the outer end of the insert. Stem 54 is slidable in an aperture in a spider 55 which rests on a shoulder above constriction 51. A compression spring 56 is interposed between the spider 55 and a spider 57 secured to stem 54, the spring normally seating the check valve member 53 against the shoulder 52.

In this embodiment of the invention the lower end of the insert is exposed to the pressure existing within the tube, with which the flattened stem is associated. Such pressure, however, can never gain access to the outside of the insert so as to get between it and the surrounding tube material, this being due to the provision of the groove in which the lower portion of the insert is fitted. The inner wall of the groove is constituted by a collar-like portion 58 of integral stem material, and the pressure not having access to the groove 49 acts to force the collar portion against the lower portion of the insert to prevent any loosening tendency of the latter.

In Figure 9 a valve stem 59 has therein a passage 60 with an upper enlargement 61 and a shoulder 62. The enlargement 61 merges in a tip enlargement 63 in which is vulcanized an insert or nipple 64, the lower end of the latter being engaged in a recess formed between the lower portion of enlargement 63 and a collar-like portion 65 of integral stem material. The insert 64 is provided with a downwardly faced shoulder 66 against which is normally seated a compressible check valve element 67 by means of a compression spring 68 interposed between the element 67 and shoulder 62. A stem 69 projecting upwardly from element 67 and fixed therein carries a spider 70 which is guided in the upper portion of the insert.

The described embodiments of the invention have great advantages in manufacture and are highly efficient in use. In all instances the stem exteriors preferably present no substantial obstructions to their ready withdrawal longitudinally through a rim aperture, and when a cap is used it is desirably proportioned with this feature in mind. For example, in Figure 1 it will be noted that the lower edge of the cap skirt is seated on a shoulder without any overhang.

It will be understood that I do not necessarily limit myself to the exact arrangements disclosed, various changes being possible within the scope of the invention as defined in the following claims.

I claim:

1. A valve stem comprising a rubber body portion provided with a through passage constricted near the tip of the stem to provide a downwardly faced shoulder, a valve element normally seated against said shoulder to close said passage, said valve element having an upwardly projecting threaded pin in connection therewith, a cap having a threaded bore in which said threaded pin is engageable upon rotation of the cap relative to the threaded pin, said cap having a skirt portion whose lower edge surrounds the tip of the stem in the vicinity of said shoulder when the cap is fully applied.

2. A valve stem comprising a rubber body portion provided with a through passage constricted near the tip of the stem to provide a downwardly faced shoulder, a valve element normally seated against said shoulder to close said passage, said valve element having an upwardly projecting threaded pin in connection therewith, a cap having a threaded bore in which said threaded pin is engageable upon rotation of the cap relative to the threaded pin, said cap having a skirt portion whose lower edge surrounds the tip of the stem in the vicinity of said shoulder when the cap is fully applied, said valve stem having an external shoulder against which the lower edge of the cap skirt reacts to pull and hold said valve element tightly against its seat.

3. A valve stem comprising a rubber body portion provided with a through passage constricted near the tip of the stem to provide a downwardly faced shoulder, a valve element normally seated against said shoulder to close said passage, a relatively rigid tubular insert in the tip end of the stem with its inner end inset into the stem material around said shoulder, and a closure applicable to the tip end of the stem and having a skirt whose lower edge in the normal applied position of the closure confines the stem in the vicinity of said shoulder.

4. A valve stem comprising a rubber body portion provided with a through passage constricted near the tip of the stem to provide a downwardly faced shoulder, a valve element normally seated against said shoulder to close said passage, a relatively rigid tubular insert in the tip end of the stem with its inner end inset into the stem material around said shoulder, a closure applicable to the tip end of the stem and having a skirt whose lower edge in the normal applied position of the closure confines the stem in the vicinity of said shoulder, and tensionable connecting means between said closure and valve element for holding said valve element against said shoulder.

5. In a pneumatic tire valve and stem, a stem member for connection with a pneumatic tube including a bore therethrough and a chamber formed intermediate the ends of said bore, the walls of said chamber and bore being yieldable, a body element axially shiftable relative to said stem including a valve head of greater diameter than said bore and less in diameter than said chamber, said valve head adapted to seal said stem member when forced into said bore and permit flow of air through said valve stem when in said chamber, and a cap member secured to said body element and embracing the extended portion of said stem.

6. A valve stem comprising an elongated rubber body having a longitudinal passage therethrough, a tubular metal insert in the outer portion of said body, a valve seat at the inner end of said insert, a movable valve body cooperable with said seat, a pin on said valve body extending outwardly within said insert, means guiding said pin with relation to said insert so that the pin is in substantially axial relation to the insert when said valve body is seated, and a cap engaged over the outer portion of said body and extending at least into adjacency with the inner end of said insert and resisting lateral distention of said body.

7. A valve stem comprising an elongated rubber body having a longitudinal passage therethrough, a tubular metal insert in the outer portion of said body, a valve seat at the inner end of said insert, a movable valve body cooperable with said seat, a pin on said valve body extending outwardly within said insert, means guiding said pin with relation to said insert so that the pin is in substantially axial relation to the insert when said valve body is seated, and a cap engaged over the outer portion of said body and extending at least into adjacency with the inner end of said insert and resisting lateral distention of said body, there being threaded anchorage means holding said cap in position on said body.

8. A valve stem comprising an elongated rubber body having a longitudinal passage therethrough, a tubular metal insert in the outer portion of said body having an annular flange disposed intermediate the ends of said body, said flange having an annulus of yielding material disposed thereagainst to provide a valve seat faced toward the inner end of said body, a movable valve body cooperable with said seat, a pin on said valve body extending outwardly within said insert, means guiding said pin with relation to said insert so that the pin is in substantially axial relation to the insert when said valve body is seated, and a cap engaged over the outer portion of said body and extending at least into adjacency with the inner end of said insert and resisting lateral distention of said body.

9. A valve stem comprising an elongated rubber body having a longitudinal passage therethrough, a tubular metal insert in the outer portion of said body having an annular flange disposed intermediate the ends of said body, said flange having an annulus of yielding material disposed thereagainst to provide a valve seat faced toward the inner end of said body, a movable valve body cooperable with said seat, a pin on said valve body extending outwardly within said insert, means guiding said pin with relation to said insert so that the pin is in substantially axial relation to the insert when said valve body is seated, and a cap engaged over the outer portion of said body and extending at least into adjacency with the inner end of said insert and resisting lateral distention of said body, there being threaded anchorage means holding said cap in position on said body.

FRANK H. WATSON.